(12) United States Patent
Kim (10) Patent No.: US 7,926,659 B2
(45) Date of Patent: Apr. 19, 2011

(54) PACKAGING CASE FOR A WIPER BLADE

(75) Inventor: In-Kyu Kim, Gyeonggi-do (KR)

(73) Assignees: ADM21 Co., Ltd., Gyeonggi-do (KR);
In-Kyu Kim, Gyeonggi-do (KR)

( * ) Notice: Subject to any disclaimer, the term of this patent is extended or adjusted under 35 U.S.C. 154(b) by 0 days.

(21) Appl. No.: 12/565,572

(22) Filed: Sep. 23, 2009

(65) Prior Publication Data

US 2010/0307940 A1 Dec. 9, 2010

(30) Foreign Application Priority Data

Jun. 8, 2009 (KR) ........................ 10-2009-0050371

(51) Int. Cl.
*B65D 69/00* (2006.01)
(52) U.S. Cl. ........................................ 206/471; 206/825
(58) Field of Classification Search .................. 206/469, 206/470, 471, 467, 461, 443, 477, 480, 482, 206/483, 825
See application file for complete search history.

(56) References Cited

U.S. PATENT DOCUMENTS

| | | | |
|---|---|---|---|
| 4,059,219 A | 11/1977 | Reifers et al. | |
| 5,353,935 A | 10/1994 | Yeager et al. | |
| 5,584,387 A | 12/1996 | Grant | |
| 5,593,036 A | 1/1997 | Dyble et al. | |
| 5,699,913 A | 12/1997 | Richardson | |
| 5,899,334 A | 5/1999 | Domerchie et al. | |
| 6,126,008 A | 10/2000 | Cox | |
| 6,321,905 B1 | 11/2001 | Sykes | |
| 6,766,906 B2 | 7/2004 | Charng | |
| 6,779,661 B1* | 8/2004 | Kotlarski | 206/349 |
| 7,337,900 B2* | 3/2008 | Reiber et al. | 206/349 |
| 7,527,151 B2* | 5/2009 | Park | 206/470 |
| 2005/0082185 A1 | 4/2005 | Lee | |
| 2005/0252812 A1* | 11/2005 | Lewis | 206/461 |
| 2006/0081493 A1* | 4/2006 | Park | 206/470 |
| 2007/0017842 A1 | 1/2007 | Clamagirand et al. | |
| 2007/0235362 A1 | 10/2007 | Lewis | |
| 2007/0272577 A1* | 11/2007 | Kim | 206/470 |
| 2008/0245691 A1* | 10/2008 | Kim | 206/335 |

FOREIGN PATENT DOCUMENTS

| | | |
|---|---|---|
| JP | 7315443 A | 12/1995 |
| JP | 10291537 A | 11/1998 |
| JP | 2000177774 A | 6/2000 |
| JP | 2003230550 A | 8/2003 |

* cited by examiner

*Primary Examiner* — Jacob K Ackun, Jr.
(74) *Attorney, Agent, or Firm* — Seed IP Law Group PLLC (57) ABSTRACT

Disclosed is a packaging case for a wiper blade that can maintain the wiper blade in a secured state by securing elements formed in the packaging case to prevent damage of the wiper blade while minimizing the volume of the packaging case and providing a suitable shape for large capacity packaging. The packaging case is used for a wiper blade curvedly deformed into an arc shape when mounted and used on a vehicle. The packaging case includes a lower case having an accommodation part receiving the wiper blade, an upper case covering the lower case to close the accommodation part, and a plurality of securing protrusions formed inside the accommodation part to allow the wiper blade to be received in the accommodation part while maintaining a linear shape.

12 Claims, 7 Drawing Sheets

PACKAGING CASE FOR A WIPER BLADE

CROSS REFERENCE TO RELATED APPLICATION

This application claims priority from and the benefit of Korean Patent Application No. 10-2009-0050371, filed on Jun. 8, 2009, which is hereby incorporated by reference for all purposes as if fully set forth herein.

BACKGROUND

1. Technical Field

The present disclosure relates to a packaging case for a wiper blade and, more particularly, to a packaging case for a wiper blade that includes securing elements to hold the wiper blade in a secured state, thereby preventing damage of the wiper blade while minimizing the volume of the packaging case and providing a suitable shape for large capacity packaging.

2. Description of the Related Art

In general, an automobile is provided with a wiper blade which cleans or wipes a windscreen of the automobile to prevent ones view from being obscured due to contamination of the windscreen caused by dirt in air or various weather conditions. The wiper blade wipes the windshield while pivoting at a predetermined angle in a state of closely contacting the windshield, thereby securing a driver's sight for safe driving.

When a rubber strip of such a wiper blade wears out and provides a reduced contacting or wiping force due to long term use, periodic or non-periodic replacement thereof with a new wiper blade is necessary. Since such a wiper blade is generally encased in a separate packaging case and sold therewith, a user selects a suitable one for his or her car and replaces the worn wiper blade with the new wiper blade.

On the other hand, since the windshield of the automobile generally has a curved surface and the wiper blade must be maintained in a close contact state with the windshield, it is necessary for the wiper blade to have a curved shape corresponding to the curved surface of the windshield.

When the packaging case is fabricated to have a curved shape corresponding to the shape of the curved wiper blade, the wiper blade is not subjected to an excessive force by the packaging case and can be easily encased in the packaging case. However, there are problems in that the packaging case has an increased volume and repackaging of a plurality of packaging cases in a large packaging box requires a large packaging space causing excessive costs for delivery and distribution.

To solve such problems, a rectangular or oblong packaging case may be used to minimize the volume of the packaging case, thereby reducing costs for delivery and distribution. In this case, however, elasticity of the wiper blade for maintaining the curved shape of the wiper blade forces rubber strips at opposite ends of the wiper blade to contact an inner surface of the packaging case, thereby causing damage of the wiper blade.

BRIEF SUMMARY

One embodiment includes a packaging case for a wiper blade that includes securing elements to hold the wiper blade in a secured state, thereby preventing damage of the wiper blade while minimizing the volume of the packaging case and providing a suitable shape for large capacity packaging.

In accordance with one aspect, a packaging case for a wiper blade curvedly deformed to an arc shape when mounted and used on a vehicle includes: a lower case having an accommodation part receiving the wiper blade; an upper case covering the lower case to close the accommodation part; and a plurality of securing protrusions formed inside the accommodation part to allow the wiper blade to be received in the accommodation part while maintaining a linear shape.

In one aspect, the wiper blade may include a wiper strip made of rubber and brought into close contact with a windshield of the vehicle; a frame on which the wiper strip is mounted; and an adapter connecting the frame to a wiper arm of the vehicle. The lower case may include a coupling protrusion coupled to the adapter to hold the adapter inside the accommodation part.

In one aspect, the securing protrusions may include at least one first securing protrusion formed inside the accommodation part to adjoin one surface of the frame during packaging and at least one second securing protrusion formed inside the accommodation part to adjoin the other surface of the frame during packaging. The first and second securing protrusions simultaneously support the frame in opposite directions to allow the frame received in the lower case to maintain a linear shape.

In one aspect, the first securing protrusion may be formed at a location inside the accommodation part where the first securing protrusion adjoins an upper surface of a central portion of the frame, and the second securing protrusion may be formed at a location inside the accommodation part where the second securing protrusion adjoins a lower surface and an end surface of the frame at either distal end of the frame.

In one aspect, the second securing protrusion may include a bent portion adjoining both the lower surface and the end surface of the frame, and a groove formed at an edge of the bent portion to allow the distal end of the frame to be resiliently coupled to the groove.

In one aspect, the securing protrusions may further include a third securing protrusion formed opposite the first securing protrusion centered on the frame to secure the frame in cooperation with the first securing protrusion.

In one aspect, the coupling protrusion may include a base protruding from a bottom of the accommodation part to support the adapter and a projection formed on the base to be fitted into a coupling hole of the adapter.

In one aspect, the coupling protrusion may further include an annular convex portion annularly protruding from a distal end of the projection to maintain coupling between the coupling protrusion and the adapter.

In one aspect, the coupling protrusion may further include an annular concave portion formed by depressing a portion of the base around the projection where the base is joined to the projection.

In one aspect, the lower case may further include a flange horizontally extending from an upper end of the accommodation part thereof and at least one first coupling element formed on the flange, and the upper case may include at least one second coupling element corresponding to the first coupling element, so that the upper and lower cases are assembled to each other through coupling between the first and second coupling elements.

In one aspect, the upper case may be integrally connected to one side of the lower case such that the upper case toward at least a portion thereof is rotated and coupled to the lower case. For example, the upper case may be pivotably connected to the lower case.

BRIEF DESCRIPTION OF THE DRAWINGS

FIGS. 3(a) to 3(d) are cross-sectional views of the lower case of the wiper blade according to one embodiment of the disclosure, particularly.

DETAILED DESCRIPTION

Hereinafter, embodiments of the present disclosure will be described in detail with reference to the accompanying drawings.

Figure 1:
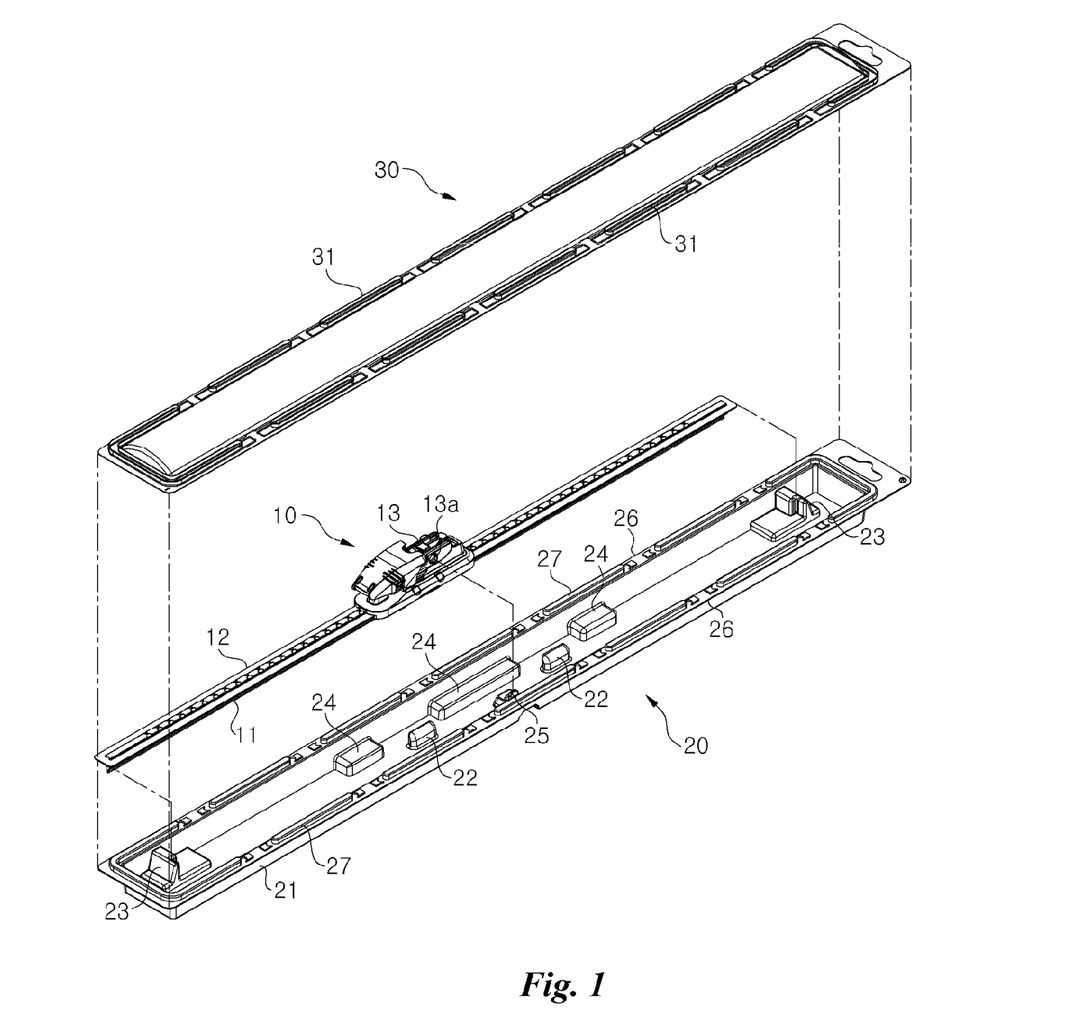
FIG. 1 is an exploded isometric view of a packaging case for a wiper blade according to one embodiment of the disclosure.
Figure 2:
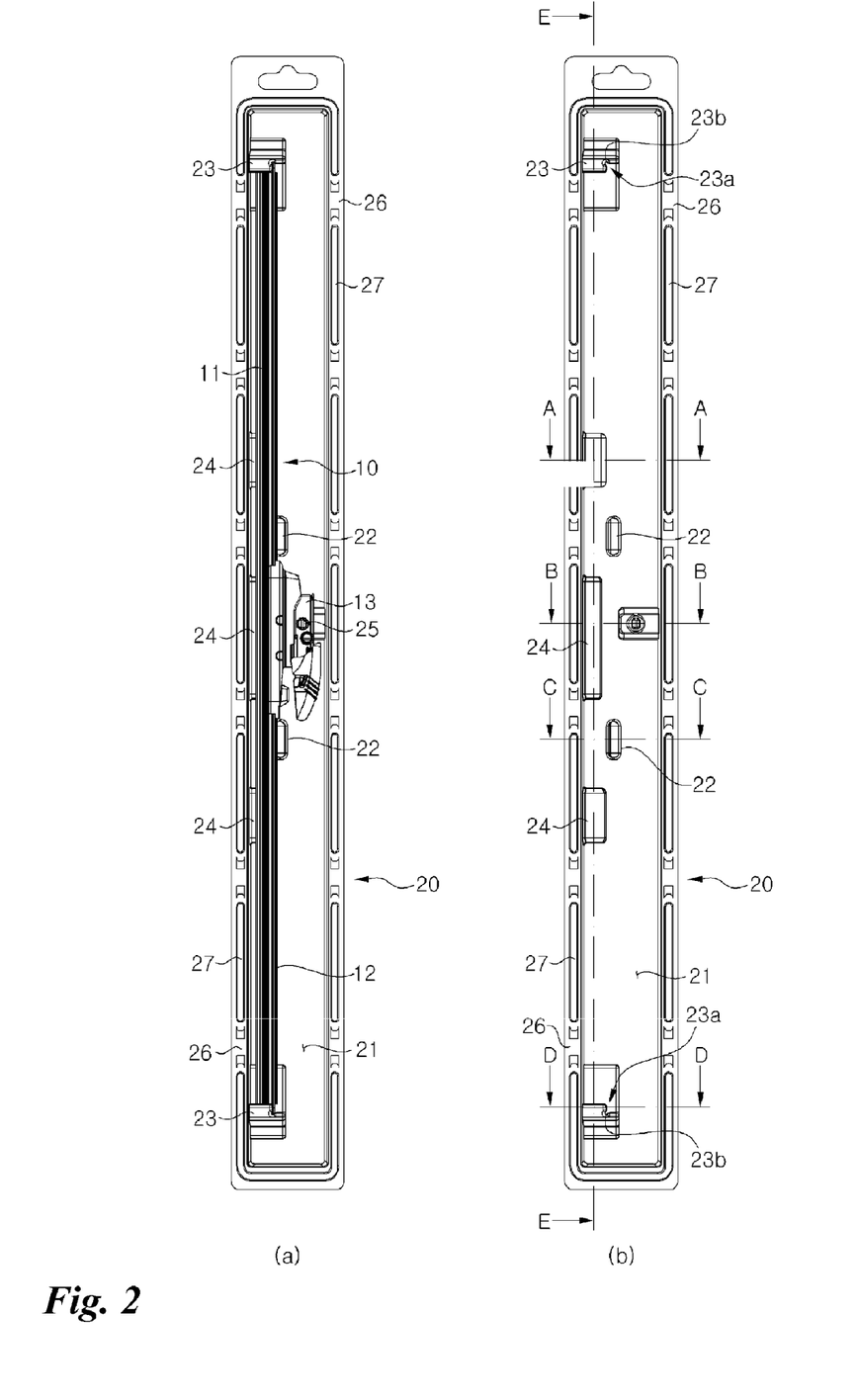
FIG. 2(a) is a plan view of a packaging case, according to one embodiment of the disclosure, in which a wiper blade is packed.
FIG. 2(b) is a plan view of a lower case of the packaging case according to one embodiment from which the wiper blade is removed.

Referring to FIGS. 1 and 2, a packaging case for a wiper blade according to one embodiment includes a lower case 20 having an interior space or accommodation part 21 formed therein to receive a wiper blade 10 and an upper case 30 configured to cover the lower case 20 to close the accommodation part 21.

The wiper blade 10 includes a wiper strip 11 made of rubber and configured to be brought into close contact with a windshield of a vehicle, a frame 12 having the wiper strip 11 mounted thereon and made of a material that provides elasticity to force the wiper strip 11 to closely contact the windshield, and an adapter 13 connecting the frame 12 to a wiper arm of the vehicle.

In FIG. 2, the wiper blade 10 is shown as having a linear shape for convenience of illustration. However, when not exposed to an external force, the wiper blade 10 has a curved shape so as to closely contact the windshield of the vehicle which has a curved plane.

The shape of the wiper blade 10 may be maintained in a curved state by elasticity of the frame 12 and the packaging case according to one embodiment may be used for packaging the wiper blade 10 having the frame 12.

The accommodation part 21 in the lower case 20 is formed therein with a plurality of first and second securing protrusions 22, 23 which are fitted into the frame 12 of the wiper blade 10 and secure the frame 12 so as to allow the frame 12 to be packed in a linearly unfolded, linear, or uncurved state within the packaging case.

The first securing protrusions 22 adjoin an upper surface of the frame 12 and the second securing protrusions 23 adjoin a lower surface of the frame 12. Herein, the term "upper" means a direction in which the adapter 13 disposed on the frame 12 is protruded, and the term "lower" means a direction opposite the protruding direction of the adapter 13 on the frame 12. Accordingly, the first securing protrusions 22 and the second securing protrusions 23 simultaneously support the upper and lower sides of the frame 12 in opposite directions, thereby allowing the frame 12 received in the lower case 20 to maintain a linear shape.

Further, as shown in FIG. 2, the first securing protrusions 22 may be formed at locations inside the accommodation part 21 where the first securing protrusions 22 can adjoin portions of the frame 12 near a periphery of the adapter 13, that is, an upper surface of the frame 12 at a central portion of the frame 12. The second securing protrusions 23 may be formed at locations inside the accommodation part 21 where the second securing protrusions 23 can adjoin a lower surface and an end surface of the frame 12 at either distal end of the frame 12.

FIG. 2 illustrates plan views of the packaging case for a wiper blade according to one embodiment. Particularly, FIG. 2(a) is a plan view of the packaging case with the wiper blade 10 packed in the lower case 20 of the packaging case, and FIG. 2(b) is a plan view of the lower case 20 from which the upper case 30 and the wiper blade 10 are removed.

Figure 5:
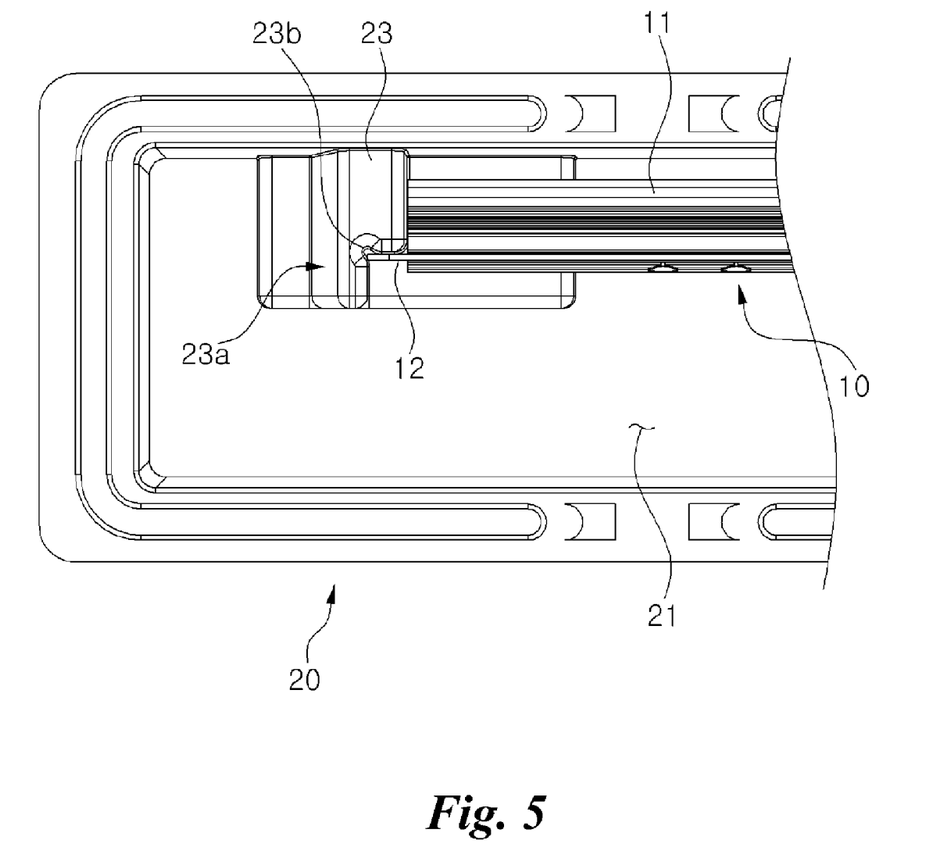
FIG. 5 is a partial plan view illustrating a coupling between the lower case and a distal end of the wiper blade according to one embodiment.

As shown in FIGS. 2 and 5, the second protrusions 23 may serve to maintain the frame 12 in a linear state in cooperation with the first securing protrusions 22 while restricting movement of the frame 12 by adjoining the opposite ends of the frame 12.

In one aspect, each of the second protrusions 23 may have a bent portion 23a which is bent in an inverted L-shape, such as a ⊤-shape, or an L-shape. Further, to ensure that the distal end of the frame 12 is positioned on the bent portion 23a of the second protrusion 23, the bent portion 23a may be formed at an edge thereof with a small groove 23b into which the distal end of the frame 12 is resiliently fitted.

The second protrusions 23 in the lower case 20, may be formed of plastic materials for general packaging cases. Since the plastic materials have elasticity, it is possible to resiliently couple the distal end of the frame 12 to the groove 23b.

Figure 7:
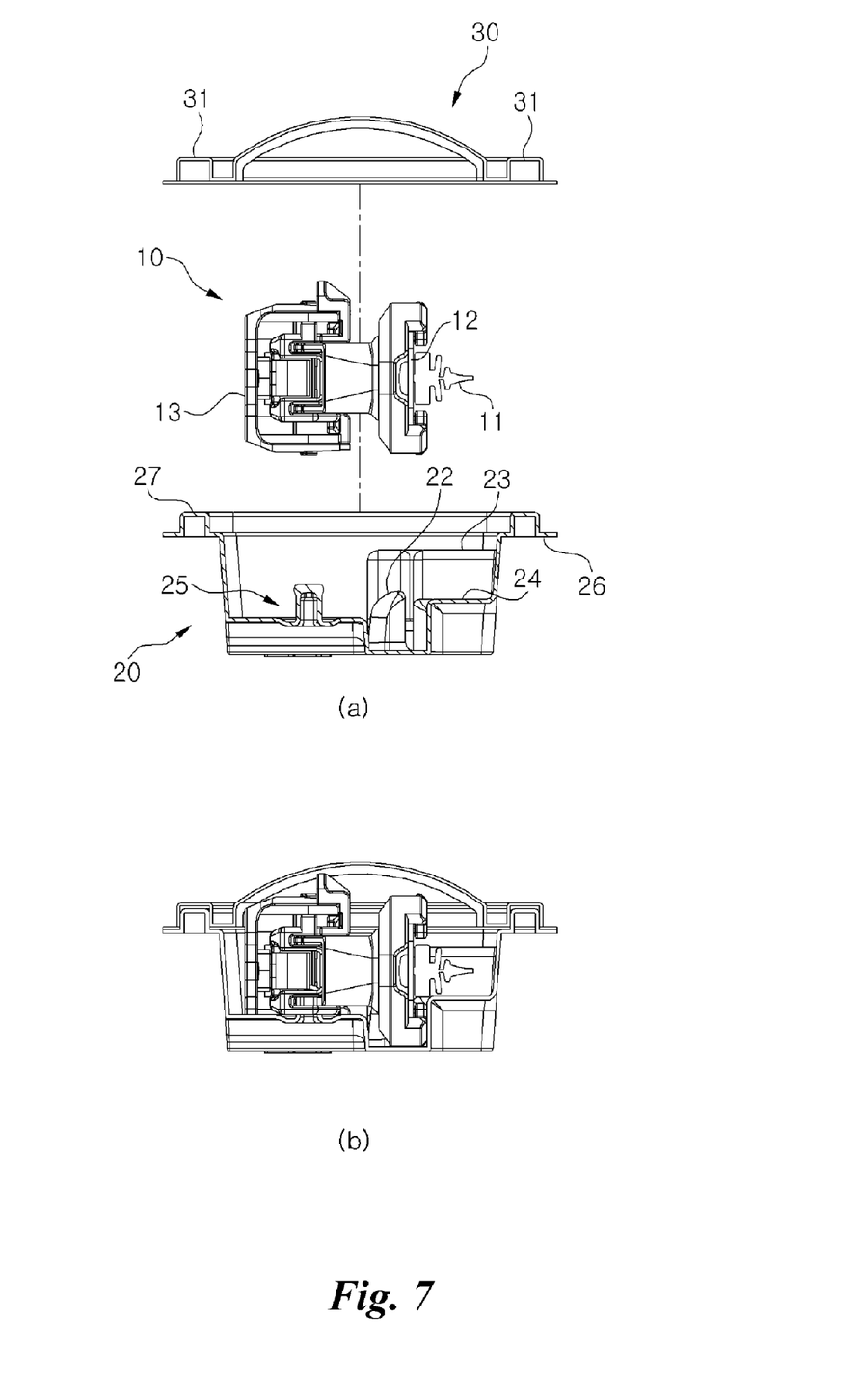
FIG. 7 is a cross-sectional view of the lower case and end views of an upper case and a wiper blade, illustrating coupling between the lower case and an intermediate region of the wiper blade, and the wiper blade being secured between the lower case and the upper case, according to one embodiment.

Referring again to FIGS. 1 and 2, according to one embodiment, in addition to the first and second securing protrusions 22, 23, the accommodation part 21 of the lower case 20 is formed therein with third securing protrusions 24 which are fitted into the frame 12 of the wiper blade 10 and secure the frame 12 in cooperation with the first securing protrusions 22. For example, as illustrated in FIGS. 2 and 7, the third securing protrusions may extend from at least a side wall of the accommodating part 21, and the first securing protrusions may extend from a lower or bottom wall of the accommodating part 21, securing the wiper blade 10 on multiple sides. Furthermore, as shown in FIG. 7(b), the third securing protrusions 24 can be sized to maintain the wiper strip 11 of the wiper blade 20 spaced from the walls of the accommodating part 21, to prevent damage thereto.

The third securing protrusions 24 may be formed opposite the first securing protrusions 22 centered on the frame 12 and/or it may alternate with the first securing protrusions 22.

In the drawings, the first securing protrusions 22 are shown as being formed at two locations and the third securing protrusions 24 are shown as being formed at three locations. However, it should be understood that this embodiment is provided for illustration and the present invention is not limited by the number of first and second securing protrusions 22, 23 shown in the drawings.

As such, according to the illustrated embodiment, the frame 12 of the wiper blade 10 is secured by the first, second and third securing protrusions 22, 23 and 24.

Further, as shown in FIGS. 1 and 2, the accommodation part 21 of the lower case 20 may be formed therein with a coupling protrusion 25 that can be coupled to a coupling hole 13a formed in the adapter 13 of the wiper blade 10 for coupling with a wiper arm of a vehicle.

According to one embodiment, since the coupling protrusion 25 of the lower case 20 is coupled to the coupling hole 13a of the wiper blade packed in the packaging case, the wiper blade 10 can be prevented from popping out from the packaging case when the packaging case is opened.

Figure 3:
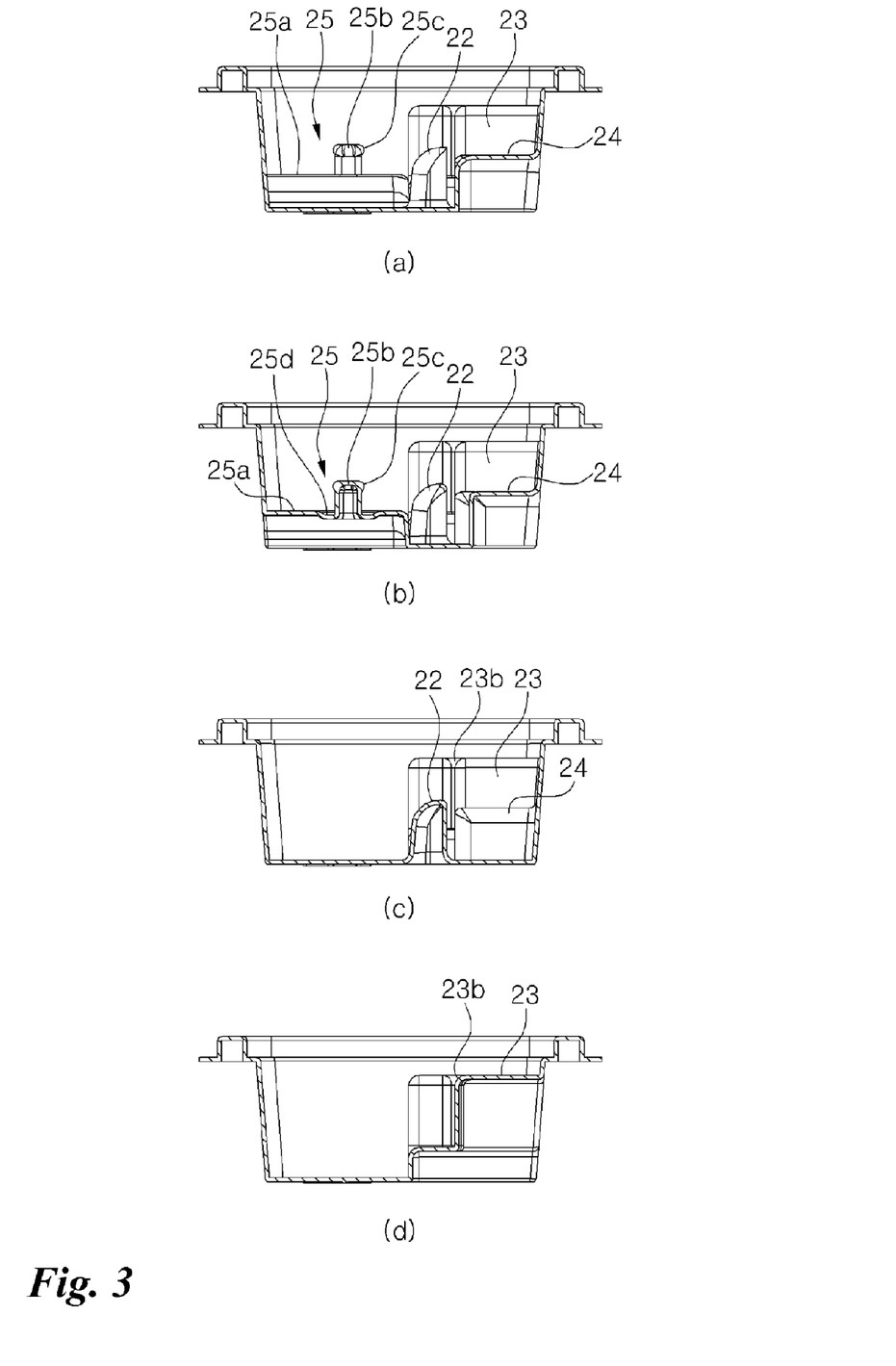
FIG. 3(a) is a cross-sectional view taken along section A-A of FIG. 2(b)
FIG. 3(b) is a cross-sectional view taken along section B-B of FIG. 2(b)
FIG. 3(c) is a cross-sectional view taken along section C-C of FIG. 2(b)
FIG. 3(d) is a cross-sectional view taken along section D-D of FIG. 2(b)
Figure 6:
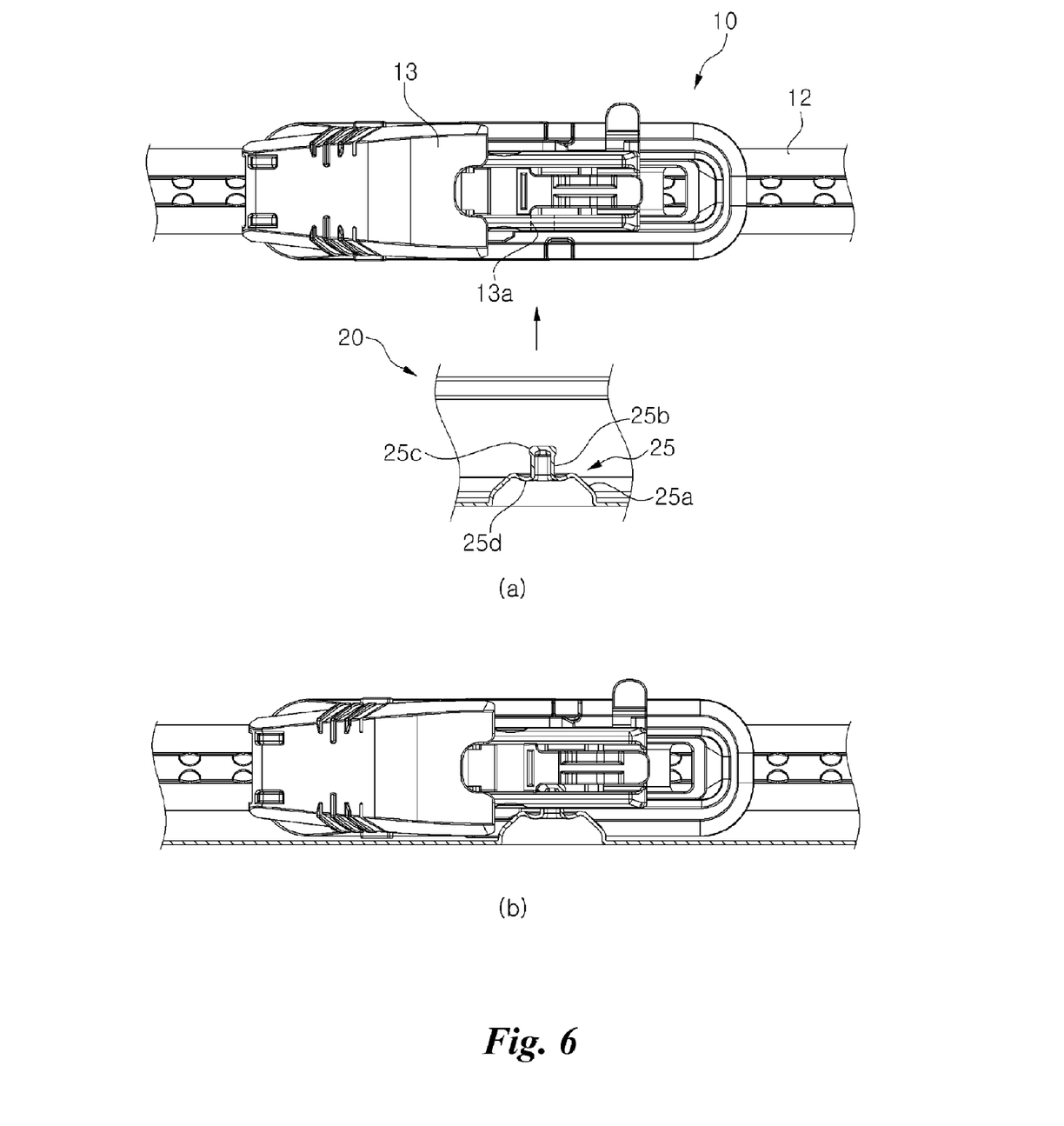
FIG. 6 is a partial plan view of a wiper blade and partial cross-sectional view of the lower case, illustrating a coupling between the lower case and an intermediate region of the wiper blade according to one embodiment.

Referring to FIGS. 3, 6 and 7, the coupling protrusion 25 includes a flat base 25a protruding from a bottom of the accommodation part 21 to support the adapter 13 and a cylindrical projection 25b formed on the base 25a to be fitted into the coupling hole 13a of the adapter 13.

The coupling protrusion 25 may further include an annular convex portion 25c or a bulged portion on a distal end of the cylindrical projection 25b to ensure coupling between the coupling protrusion 25 and the adapter 13. When the cylindrical projection 25b is fitted into the coupling hole 13a of the adapter 13, the annular convex portion 25c is elastically deformable, thereby preventing the adapter 13 from being easily separated from the coupling protrusion 25.

Further, an annular concave portion 25d may be formed at a joined portion between the base 25a and the cylindrical protrusion 25b of the coupling protrusion 25 by annularly depressing the joined portion of the base 25a around the projection 25b, as shown in FIGS. 3(b), 5 and 6.

Referring to the drawings, the adapter 13 of the wiper blade 10 is formed with the coupling hole 13a, into which the wiper arm of a vehicle is inserted and coupled to, and the lower case 20 of the packaging case is formed with the coupling protrusion 25 that is shaped corresponding to the coupling hole 13a. According to an alternative embodiment, however, for a wiper blade where an adapter is not formed with a circular coupling hole, the lower case of the packaging case may be formed with a coupling protrusion configured to secure the adapter through resilient coupling with the adapter.

Figure 4:
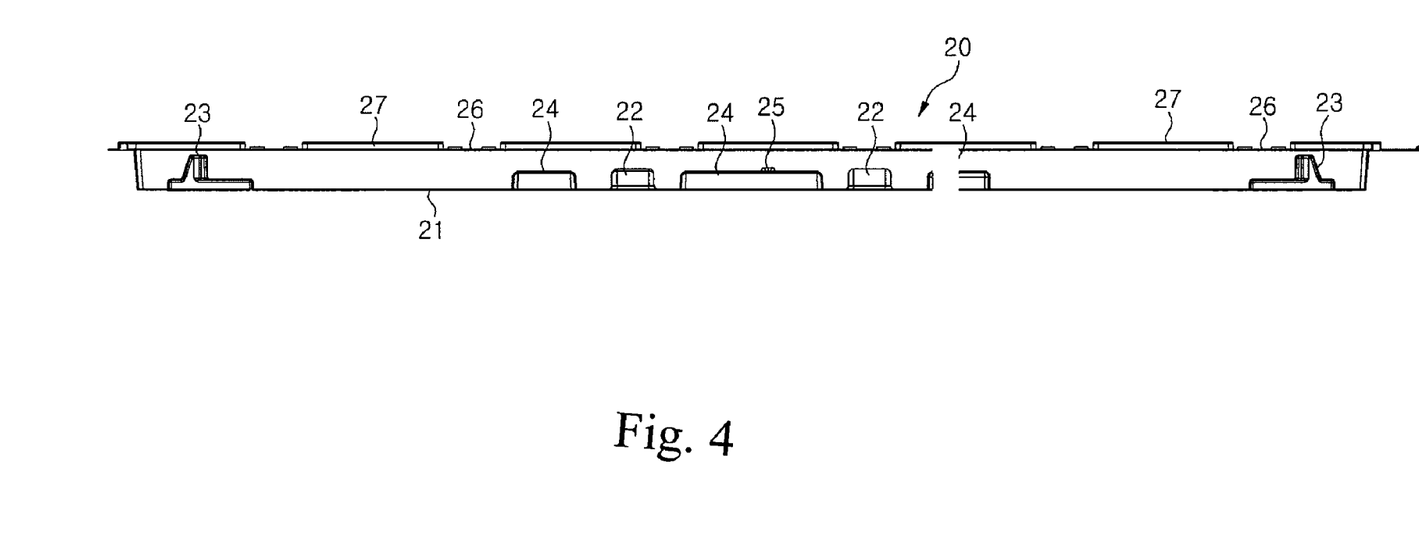
FIG. 4 is a cross-sectional view of the lower case taken along section E-E of FIG. 2(b)

In one aspect, as illustrated in FIGS. 4 and 7, a flange 26 may horizontally extend from an upper end of the accommodation part 21 of the lower case 20 for coupling with the upper case 30. The flange 26 may have at least one first coupling element 27 formed thereon.

Further, the upper case 30 may include a second coupling element 31 formed on a periphery thereof and shaped corresponding to the first coupling element 27. Accordingly, as shown in FIG. 7, the upper and lower cases 30, 20 can be assembled to each other through coupling between the first coupling element 27 and the second coupling element 31.

In FIG. 7, the upper case 30 is shown as having a convexly curved central portion. However, the central portion of the upper case 30 may have a rectangular convex shape. In one embodiment, as illustrated in FIG. 7(b), a portion of the wiper blade 10 may extend into a space defined by the concavity in the upper case 30 when the upper case 30 is coupled to the lower case 20.

In one embodiment, the upper case 30 has been described as being fabricated as a separate component, which will be coupled to the lower case 20 to provide a complete packaging case. It should be understood, however, that the upper case may be integrally formed with one side of the lower case. In this case, the upper case may be rotated about the one side of the lower case for coupling with the lower case.

As apparent from the description, according to the embodiment, when packaged inside the packaging case, the wiper blade is maintained in a secured state by securing elements formed in the packaging case to prevent damage of the wiper blade while minimizing the volume of the packaging case and providing a suitable shape for large capacity packaging.

Further, according to the embodiment, the packaging case can minimize the volume of the wiper blade without damaging the wiper blade encased in the packaging case, thereby enabling a reduction in cost for delivery and distribution of the wiper blade.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A packaged wiper blade comprising:
 a wiper blade, the wiper blade having a wiper strip, a frame on which the wiper strip is mounted and an adapter for connecting the frame to a wiper arm of a vehicle, the wiper blade curvedly deformed to an arc shape; and
 a packaging case enclosed around the wiper blade, the packaging case having a lower case with an accommodation part for receiving the wiper blade and an upper case covering the lower case to close the accommodation part, the packaging case further including a plurality of securing protrusions formed inside the accommodation part to engage the wiper blade and maintain the wiper blade in a linear state and a coupling protrusion formed inside the accommodation part, the coupling protrusion coupled to the adapter of the wiper blade to secure the adapter inside the accommodation part.

2. The packaged wiper blade according to claim 1, wherein the securing protrusions of the packaging case comprise at least one first securing protrusion formed inside the accommodation part to adjoin a first surface of the frame of the wiper blade during packaging and at least one second securing protrusion formed inside the accommodation part to adjoin a second surface of the frame during packaging, the first and second securing protrusions simultaneously supporting the frame in opposite directions to allow the frame received in the lower case to maintain a linear state.

3. The packaged wiper blade according to claim 2, wherein the first securing protrusion is formed at a location inside the accommodation part, the first securing protrusion adjoining an upper surface of a central portion of the frame, and the second securing protrusion being at a location inside the accommodation part, the second securing protrusion adjoining a lower surface and an end surface of the frame at an end of the frame.

4. The packaged wiper blade according to claim 2, wherein the second securing protrusion comprises a bent portion adjoining both a lower surface and an end surface of the frame, and a groove formed at an edge of the bent portion to allow a distal end of the frame to be resiliently coupled to the groove.

5. The packaged wiper blade according to claim 2, wherein the securing protrusions further comprise a third securing protrusion formed opposite the first securing protrusion centered on the frame to secure the frame in cooperation with the first securing protrusion.

6. The packaged wiper blade according to claim 1, wherein the coupling protrusion comprises a base protruding from a bottom of the accommodation part to support the adapter and a projection formed on the base to be fitted into a coupling hole of the adapter.

7. The packaged wiper blade according to claim 6, wherein the coupling protrusion further comprises an annular convex portion annularly protruding from a distal end of the projection to maintain coupling between the coupling protrusion and the adapter.

8. The packaged wiper blade according to claim 6, wherein the coupling protrusion comprises an annular concave portion formed by depressing a portion of the base around the projection, the base being joined to the projection.

9. The packaged wiper blade according to claim 1, wherein the lower case further comprises a flange horizontally extending from an upper end of the accommodation part thereof and at least one first coupling element formed on the flange, and the upper case comprises at least one second coupling element corresponding to the first coupling element, so that the upper and lower cases are assembled to each other through coupling between the first and second coupling elements.

10. The packaged wiper blade according to claim 1, wherein the upper case is integrally connected to one side of the lower case such that the upper case is configured to be rotated and coupled to the lower case.

11. A packaged wiper blade comprising:
   a wiper blade having a frame securing a wiper strip, and naturally being in a curved state and configured to be biased into a linear state; and
   a packaging case enclosed around the wiper blade, the packaging case including
      a first case including a receptacle configured to receive the wiper blade and having a plurality of walls forming an interior space;
      a second case configured to be coupled to the first case and cover the interior space;
      at least a first type of securing protrusion protruding from at least one of the plurality of walls of the receptacle, the first type of securing protrusion being positioned toward a longitudinal end of the interior space and having a bent flange sized and shaped to engage a first surface of the wiper blade;
      at least a second type of securing protrusion protruding from at least one of the plurality of walls of the receptacle, the second type of securing protrusion being positioned between opposing longitudinal ends of the interior space, and being sized and shaped to engage a second surface of the wiper blade, different from the first surface, the first and second types of securing protrusions configured to cooperate to bias and maintain the wiper blade in the linear state; and
      a coupling protrusion coupled to or formed on at least one of the plurality of walls of the receptacle, the coupling protrusion engaged with an engagement feature of a wiper arm adaptor of the wiper blade.

12. The packaging case packaged wiper blade of claim 11, further comprising:
   at least a third type of securing protrusion extending from at least one of the plurality of walls of the receptacle, the third type of securing protrusion being positioned between opposing longitudinal ends of the interior space and sized and shaped to engage a third surface of the wiper blade adjacent the wiper strip, spacing the wiper strip from the walls of the receptacle.

* * * * *

UNITED STATES PATENT AND TRADEMARK OFFICE
CERTIFICATE OF CORRECTION

| | | |
|---|---|---|
| PATENT NO. | : 7,926,659 B2 | Page 1 of 1 |
| APPLICATION NO. | : 12/565572 | |
| DATED | : April 19, 2011 | |
| INVENTOR(S) | : In-Kyu Kim | |

It is certified that error appears in the above-identified patent and that said Letters Patent is hereby corrected as shown below:

Column 8, Line 27:
"12. The packaging case packaged wiper blade of claim 11," should read, --12. The packaged wiper blade of claim 11,--.

Signed and Sealed this
Seventh Day of June, 2011

David J. Kappos
*Director of the United States Patent and Trademark Office*